(12) United States Patent
Jiang et al.

(10) Patent No.: US 10,749,682 B2
(45) Date of Patent: Aug. 18, 2020

(54) ANTI-COUNTERFEIT METHOD (71) Applicant: SHENZHEN QIANHAI QUANTUM CLOUD TECHNOLOGY CO., LTD., Guangdong (CN)

(72) Inventors: Tao Jiang, Guangdong (CN); Ye Cheng, Guangdong (CN); Qiaoti Tang, Guangdong (CN)

(73) Assignee: SHENZHEN QIANHAI QUANTUM CLOUD TECHNOLOGY CO., LTD. (CN)

(*) Notice: Subject to any disclaimer, the term of this patent is extended or adjusted under 35 U.S.C. 154(b) by 215 days.

(21) Appl. No.: 15/743,502

(22) PCT Filed: Sep. 13, 2016

(86) PCT No.: PCT/CN2016/098922
§ 371 (c)(1),
(2) Date: Jan. 10, 2018

(87) PCT Pub. No.: WO2017/045594
PCT Pub. Date: Mar. 23, 2017

(65) Prior Publication Data
US 2018/0205548 A1 Jul. 19, 2018

(30) Foreign Application Priority Data
Sep. 17, 2015 (CN) .......................... 2015 1 0590539

(51) Int. Cl.
*H04L 9/32* (2006.01)
*G06K 19/08* (2006.01)
(Continued)

(52) U.S. Cl.
CPC ............ *H04L 9/3231* (2013.01); *G06F 21/40* (2013.01); *G06K 19/06037* (2013.01);
(Continued)

(58) Field of Classification Search
CPC ..... H04L 9/3231; H04L 9/14; H04L 63/0866; H04L 63/0869; H04L 9/0866;
(Continued)

(56) References Cited

U.S. PATENT DOCUMENTS

| 8,534,544 | B1* | 9/2013 | Eker | .................. | G06K 9/00577 |
| | | | | | 235/375 |
| 2002/0129251 | A1* | 9/2002 | Itakura | ............. | G06K 19/06037 |
| | | | | | 713/176 |

(Continued)

FOREIGN PATENT DOCUMENTS

| CN | 101345619 A | 1/2009 |
| CN | 102163291 A | 8/2011 |

(Continued)

OTHER PUBLICATIONS

H. P. Nguyen, F. Retraint, F. Morain-Nicolier and A. Delahaies, "A Watermarking Technique to Secure Printed Matrix Barcode—Application for Anti-Counterfeit Packaging," in IEEE Access, vol. 7, pp. 131839-131850, 2019. (Year: 2019).*

(Continued)

*Primary Examiner* — Karl L Schmidt
(74) *Attorney, Agent, or Firm* — McDonald Hopkins LLC (57) ABSTRACT

An anti-counterfeit method includes: obtaining raw data to be encoded; collecting fingerprint data by analogue acquisition to obtain initial fingerprint feature information and encrypting the initial fingerprint feature information to obtain a random feature secret key, the random feature secret key comprising a first sub secret key and a second sub secret key and the first sub secret key is encoded into a microtexture image while the second sub secret key is embedded in an encryption program; encrypting, through the random feature secret key, the raw data to be encoded to generate an information code image, the information code image comprising the micro-texture image; passing an anti-counterfeit (Continued)

authentication when an image sensor succeeds in integrating the first sub secret key and the second sub secret key to generate the random feature secret key; and succeeding in decrypting, by the image sensor, the information code image through the random feature secret key.

15 Claims, 3 Drawing Sheets

(51) Int. Cl.
    *H04L 9/08*     (2006.01)
    *G06F 21/40*     (2013.01)
    *H04L 9/14*     (2006.01)
    *G06K 19/06*     (2006.01)
    *G06Q 30/00*     (2012.01)

(52) U.S. Cl.
    CPC ....... *G06K 19/086* (2013.01); *G06Q 30/0185* (2013.01); *H04L 9/0866* (2013.01); *H04L 9/0869* (2013.01); *H04L 9/14* (2013.01); *H04L 2209/805* (2013.01)

(58) Field of Classification Search
    CPC . H04L 9/0869; G06F 21/40; G06K 19/06037; G06K 19/086
    See application file for complete search history.

(56) References Cited

U.S. PATENT DOCUMENTS

| | | | | |
|---|---|---|---|---|
| 2004/0153649 | A1* | 8/2004 | Rhoads | G06F 17/241 713/176 |
| 2004/0168071 | A1* | 8/2004 | Silverbrook | B41J 2/14 713/189 |
| 2006/0095778 | A1* | 5/2006 | He | G06Q 10/087 713/180 |
| 2010/0012736 | A1* | 1/2010 | Wilds | G06K 7/14 235/494 |
| 2010/0027851 | A1* | 2/2010 | Walther | G06K 5/00 382/112 |
| 2011/0002012 | A1* | 1/2011 | Amagai | G06K 19/06046 358/3.28 |
| 2011/0216143 | A1* | 9/2011 | Wang | B41J 2/00 347/107 |
| 2012/0274739 | A1* | 11/2012 | Li | H04N 5/2624 348/36 |
| 2013/0092731 | A1* | 4/2013 | Pettersson | G06K 19/08 235/375 |
| 2015/0378842 | A1* | 12/2015 | Tomlinson | G06F 21/40 380/28 |
| 2016/0050565 | A1* | 2/2016 | Benoit | H04W 12/06 726/9 |
| 2016/0267369 | A1* | 9/2016 | Picard | G06K 7/1417 |
| 2016/0350568 | A1* | 12/2016 | Zazzu | G06K 7/1447 |
| 2017/0017967 | A1* | 1/2017 | Ming | G06K 1/00 |
| 2017/0262862 | A1* | 9/2017 | Aljawhari | G06F 16/242 |
| 2017/0330200 | A1* | 11/2017 | Micali | G06F 7/582 |

FOREIGN PATENT DOCUMENTS

| | | | | |
|---|---|---|---|---|
| CN | 102546174 | A | 7/2012 | |
| CN | 204463211 | U | 7/2015 | |
| CN | 104915584 | A | 9/2015 | |
| CN | 105099712 | A | 11/2015 | |
| EP | 2722191 | A1 * | 4/2014 | ............ B42D 25/00 |
| WO | 2011057983 | A1 | 5/2011 | |
| WO | WO-2015067725 | A1 * | 5/2015 | ......... G06K 7/10722 |

OTHER PUBLICATIONS

C. Sun, P. Kuan, Y. Wang, C. Lu and H. Wang, "Integration of Graphic QR code and Identity Documents by Laser Perforation to Enhance Anti-Counterfeiting Features," 2018 IEEE International Conference on Multimedia & Expo Workshops (ICMEW), San Diego, CA, 2018, pp. 1-6. (Year: 2018).*

Wang Haoliang, Wang Lili and Bai Chenming, "The application of digital signature Technology and fingerprint identification in 2D barcode person identity," World Automation Congress 2012, Puerto Vallarta, Mexico, 2012, pp. 1-4. (Year: 2012).*

Cui, Zhouping, et al. "A New Type of Two-dimensional Anti-counterfeit Code for Document Authentication Using Neural Networks." Proceedings of the 2020 4th International Conference on Cryptography, Security and Privacy. 2020. pp. 68-73. (Year: 2020).*

International Search Report dated Nov. 30, 2016; International Application No. PCT/CN2016/098922, filed on Sep. 13, 2016. ISA/CN.

* cited by examiner

ANTI-COUNTERFEIT METHOD

CROSS-REFERENCE TO RELATED APPLICATION

This application is a 35 U.S.C. 371 national stage filing of PCT Application No. PCT/CN2016/098922 filed on Sep. 13, 2016, which claims priority to Chinese Patent Application No. 201510590539.1 filed on Sep. 17, 2015, each of which are incorporated herein in their entirety by reference.

TECHNICAL FIELD

The present disclosure relates to the field of anti-counterfeiting, and in particular to an anti-counterfeit method.

BACKGROUND

Data encryption refers to converting plaintext into ciphertext through an encryption algorithm and an encryption secret key, and data decryption refers to restoring the ciphertext to the plaintext through the decryption algorithm and the decryption secret key. A core of the data encryption and the data decryption is cryptography.

In cryptography, to prevent the secret key from being decoded, encrypting and decrypting a two-dimensional bar code in different phases may constitute different solutions. A first solution is first encrypting an information source and then encoding the information source. In this solution, ciphertext is obtained after the two-dimensional bar code is decoded, and the ciphertext can be read only through a decryption program. A second solution is first encoding the source code into a code word and then encrypting the code word. Other solutions may be formed from a combination of the preceding solutions to encrypt the two-dimensional bar code. Since a two-dimensional bar code reader has been commercialized, any two-dimensional bar code meeting national standards can be decoded into information by the two-dimensional bar code reader.

In the related art, it is common to use a random number as the secret key. A lot of researches on a random number generator have been conducted. However, up to now, no one has proved that a digital sequence is completely random; however, it is difficult to find out the law of the random number. The random number generator used for the secret key includes ANSIX9.17 and FIPS186 of Federal Information Processing Standards. Although the random number generator supports for the problem of deciphering the secret key, but it does not solve an authentication problem of who generates the random number.

In the related art, a common practice in information management is storing information about an item in a two-dimensional bar code, and the information about the item can be read automatically through recognition of the two-dimensional code. However, the two-dimensional code is easy to be recognized and counterfeited, so the two-dimensional code has a poor anti-counterfeit function.

SUMMARY

The present disclosure provides an anti-counterfeit method to improve the anti-counterfeit function.

In one aspect, an embodiment of the present disclosure provides an anti-counterfeit method, which includes:
obtaining raw data to be encoded;
collecting fingerprint data by analogue acquisition to obtain initial fingerprint feature information and encrypting the initial fingerprint feature information to obtain a random feature secret key, wherein the random feature secret key includes a first sub secret key and a second sub secret key and wherein the first sub secret key is encoded into a micro-texture image while the second sub secret key is embedded in an encryption program;
encrypting, through the random feature secret key, the raw data to be encoded to generate an information code image, wherein the information code image includes the micro-texture image;
passing an anti-counterfeit authentication if an image sensor succeeds in integrating the first sub secret key and the second sub secret key to generate the random feature secret key; and
succeeding in decrypting, by the image sensor, the information code image through the random feature secret key.

Optionally, after the random feature secret key is used to encrypt the raw data to be encoded to generate the information code image, if the image sensor fails to integrate the first sub secret key and the second sub secret key to generate the random feature secret key, the anti-counterfeit authentication is not passed and current communication is terminated.

Optionally, encrypting the initial fingerprint feature information to generate the random feature secret key includes:
denoting the initial fingerprint feature information as a matrix M=[X1 X2 X3 Xp] p×n composed of values of variables P=[x y] observed at n times, where P denotes a randomly simulated fingerprint feature point, and the functional relationship between P1, x and y is $$P1 = \begin{bmatrix} x' \\ y' \end{bmatrix} \text{ and } \begin{cases} x' = x + t_x \\ y' = y + t_y \end{cases},$$

where T is a translation vector and $$T = \begin{bmatrix} t_x \\ t_y \end{bmatrix},$$

P1 is a fingerprint feature point formed by translating P;
performing P2=R×P1, where P2 is a fingerprint feature point formed by rotating P1, θ and R are a rotated angle and a rotation matrix respectively, where R, x and y form a functional relationship $$R \begin{bmatrix} \cos\theta - \sin\theta \\ \sin\theta \cos\theta \end{bmatrix} \text{ and } \begin{cases} x' = x\cos\theta - y\sin\theta \\ y' = x\sin\theta + y\cos\theta \end{cases};$$

forming a scaling matrix S through the rotated and translated P2 and performing $$P3 = S \times P2 \text{ through } \begin{cases} x' = S_x x \\ y' = S_y y \end{cases}, \text{ where } S = \begin{bmatrix} S_x 0 \\ 0 S_y \end{bmatrix},$$

Sx and Sy have a same value, and P3 is a fingerprint feature point formed by scaling P2; and
splicing the fingerprint feature point P3 to obtain the random feature secret key, wherein the fingerprint feature point P3 is obtained from translation, rotation and scaling.

Optionally, the image sensor possesses at least one of spectral characteristics including infrared light, visible light and ultraviolet light.

Optionally, the micro-texture image refers to an image which is provided with more than one set of dots that are disposed inside and at a periphery of the image and that are capable of recording information and geometrically and physically distributed, wherein the size of each dot is 1 to 4 pixels.

In a second aspect, an embodiment of the present disclosure provides a computer-readable storage medium, which is configured to store computer-executable instructions for implementing any anti-counterfeit method provided by embodiments of the present disclosure.

In a third aspect, an embodiment of the present disclosure provides an electronic device comprising at least one processor and a memory which is connected to and communicates with the at least one processor, wherein the memory stores instructions executable by the at least one processor that, when executing the instructions, implements any anti-counterfeit method provided by embodiments of the present disclosure.

The anti-counterfeit method provided by embodiments of the present disclosure includes: obtaining raw data to be encoded; collecting fingerprint data by analogue acquisition to obtain initial fingerprint feature information and encrypting the initial fingerprint feature information to obtain a random feature secret key, the random feature secret key comprising a first sub secret key and a second sub secret key and the first sub secret key is encoded into a micro-texture image while the second sub secret key is embedded in an encryption program; encrypting, through the random feature secret key, the raw data to be encoded to generate an information code image, the information code image comprising the micro-texture image; passing an anti-counterfeit authentication when an image sensor succeeds in integrating the first sub secret key and the second sub secret key to generate the random feature secret key; and succeeding in decrypting, by the image sensor, the information code image through the random feature secret key. The micro-texture image contained in the information code image effectively prevents the possibility of counterfeit in batches physically and algorithmically. Compared with the two-dimensional bar code in the related art, the anti-counterfeit method provided by embodiments of the present disclosure is more advanced in anti-counterfeit performance and better in an anti-counterfeit function.

DETAILED DESCRIPTION

Embodiments of the present disclosure will be described below in conjunction with the accompanying drawings in the Specification. If not in conflict, the following embodiments and features thereof may be combined with each other.

Embodiment 1

Figure 1:
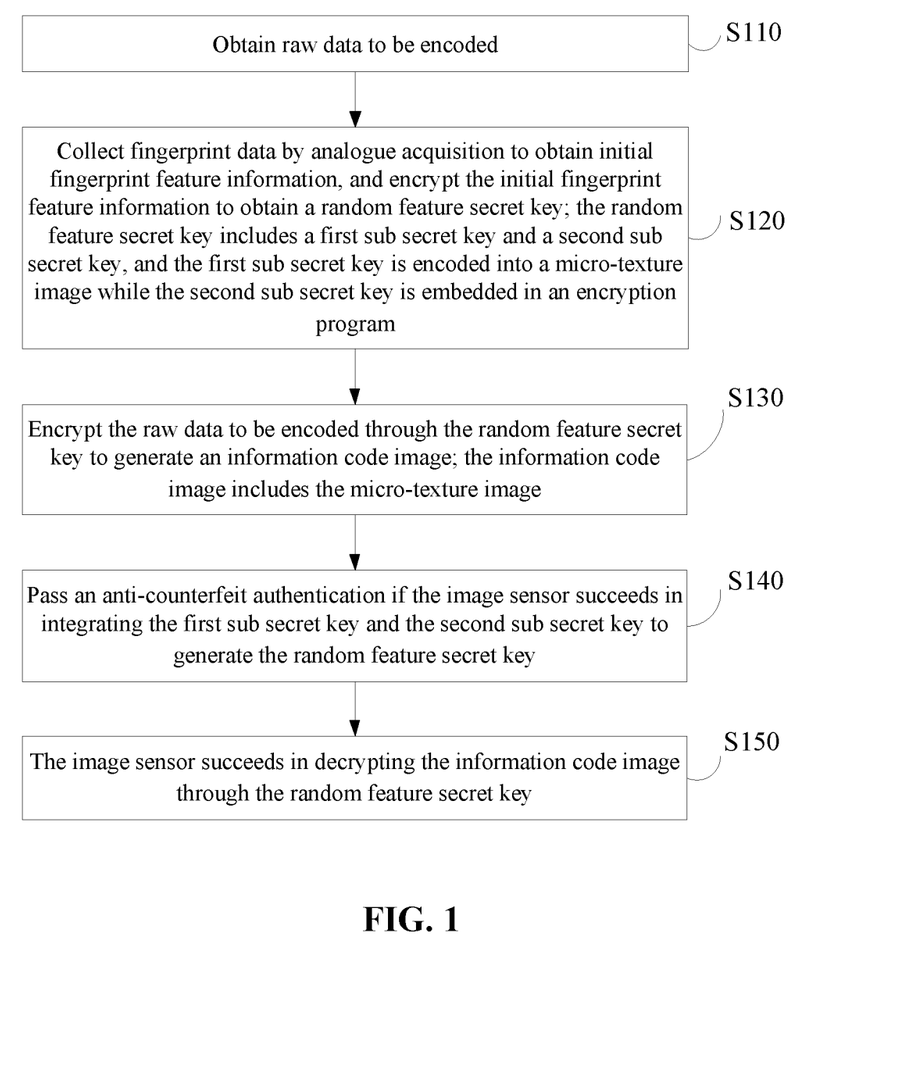
FIG. 1 is a flowchart of an anti-counterfeit method according to embodiment 1 of the present disclosure.

FIG. 1 is a flowchart of an anti-counterfeit method according to embodiment 1 of the present disclosure. The method includes steps described below.

In step S110, raw data to be encoded are obtained;

In step S120, fingerprint data are collected by analogue acquisition to obtain initial fingerprint feature information, and the initial fingerprint feature information is encrypted to obtain a random feature secret key; the random feature secret key includes a first sub secret key and a second sub secret key, and the first sub secret key is encoded into a micro-texture image while the second sub secret key is embedded in an encryption program.

The initial fingerprint feature information refers to some texture features. The texture features are encrypted so that the random feature secret key is obtained.

The encrypting the initial fingerprint feature information to obtain the random feature secret key includes steps described below.

The initial fingerprint feature information is denoted as a matrix M=[X1 X2 X3 . . . Xp]p×n composed of values of variables P=[x y] observed at n times; P denotes a randomly simulated fingerprint feature point, and the functional relationship between P1, x and y is $$P1 = \begin{bmatrix} x' \\ y' \end{bmatrix} \text{ and } \begin{cases} x' = x + t_x \\ y' = y + t_y \end{cases};$$

T is a translation vector and $$T = \begin{bmatrix} t_x \\ t_y \end{bmatrix},$$

P1 is a fingerprint feature point formed by translating P. P2=R×P1 is performed, where P2 is a fingerprint feature point formed by rotating P1, θ and R are a rotated angle and a rotation matrix respectively; R, x and y form a functional relationship $$R \begin{bmatrix} \cos\theta - \sin\theta \\ \sin\theta \cos\theta \end{bmatrix} \text{ and } \begin{cases} x' = x\cos\theta - y\sin\theta \\ y' = x\sin\theta + y\cos\theta \end{cases}.$$

A scaling matrix S is formed for the rotated and translated P2 and performing $$P3 = S \times P2 \text{ using } \begin{cases} x' = S_x x \\ y' = S_y y \end{cases}, \text{ where } S = \begin{bmatrix} S_x 0 \\ 0 S_y \end{bmatrix},$$

Sx and Sy have a same value, and P3 is a fingerprint feature point formed by scaling P2. The fingerprint feature point P3 is spliced to obtain the random feature secret key; the fingerprint feature point P3 is obtained from translation, rotation and scaling.

The random feature secret key includes the first sub secret key and the second sub secret key. The second sub secret key is embedded in the encryption program. Optionally, the first sub secret key is stored in the micro-texture image.

The micro-texture image refers to an image which is provided with more than one set of dots that are disposed inside and at a periphery of the image and that are capable of recording information and geometrically and physically distributed. The size of each dot is 1 to 4 pixels.

Figure 2:
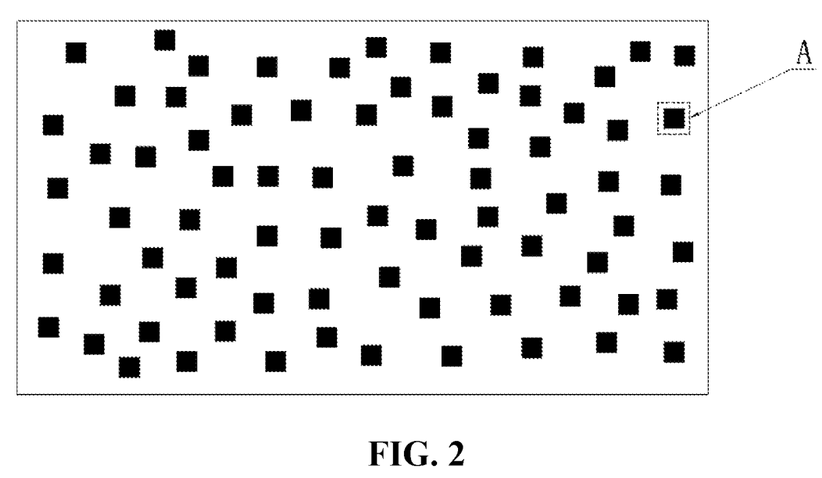
FIG. 2 is an enlarged view of a micro-texture image according to embodiment 1 of the present disclosure.

FIG. 2 is an enlarged view of a micro-texture image. A micro-texture image is provided with more than one set of micro dots that are disposed inside and at a periphery of the image and that are capable of recording information and geometrically and physically distributed. A dot A in the figure is a detail feature area that is extracted randomly. A size of the dot A is randomly selected to be comprised between 1 and 4 pixels. The micro-texture image forms a rectangular frame. The rectangular frame is located outside a body of the two-dimensional bar code. The micro-texture image can be printed on print media in a form of image data or vector data. The micro-texture image can be recognized by the image sensor. The image sensor may be a scanner, a camera of a mobile terminal or a CMOS image sensor, etc.

The image sensor possesses at least one of spectral characteristics including infrared light, visible light and ultraviolet light.

In step S130, the raw data to be encoded is encrypted through the random feature secret key to generate an information code image. The information code image includes the micro-texture image.

After the random feature secret key is generated, the raw data to be encoded is encrypted through the random feature secret key to generate the information code image. The information code image includes the micro-texture image.

After the information code image is generated, an encryption process in the anti-counterfeit method is completed. The information code image is attached to a corresponding position. The raw data to be encoded can be obtained when the information code image is successfully recognized.

In step S140, an anti-counterfeit authentication is passed if the image sensor succeeds in integrating the first sub secret key and the second sub secret key to generate the random feature secret key.

The first sub secret key and the second sub secret key form the random feature secret key in a certain combination mode or according to a certain algorithm. The micro-texture image is decoded by the image sensor to generate the first sub secret key. The anti-counterfeit authentication is passed if the first sub secret key and the second sub secret key stored in the decryption program form the random feature secret key successfully.

In step S150, the image sensor succeeds in decrypting the information code image through the random feature secret key.

After the random feature secret key is obtained, the decryption program in the image sensor succeeds in decrypting the information code image through the random feature secret key.

Optionally, after the random feature secret key is used to encrypt the raw data to be encoded to generate the information code image, if the image sensor fails to integrate the first sub secret key and the second sub secret key to generate the random feature secret key, the anti-counterfeit authentication is not passed and current communication is terminated.

If the first sub secret key and the second sub secret key fail to be combined to form the random feature secret key, anti-counterfeit authentication is not passed and the current communication is terminated. In this case, the decryption fails.

In the embodiment of the present disclosure, the information source is encrypted first, and then encoded. Ciphertext is obtained after the information code image is decoded. The information code image can be recognized and read only through the decryption program. In the random feature secret key that is generated when the information code image is generated, the first sub secret key is stored in the micro-texture image, and the second sub secret key is embedded in the encryption program. Meanwhile, the raw data to be encoded is encrypted through the random feature secret key and then stored in the information code image. During a recognition process, the counterfeiter cannot accordingly change content stored in the information code image even if the product information is changed.

In a process of extracting anti-counterfeit coded information, the product information corresponding to the information code image can be obtained only after the first sub secret key is obtained in a case where the micro-texture image is recognized successfully and decryption is performed through the secret key (i.e., the second sub secret key) in the encryption program and the first sub secret key.

The encryption method provided by the embodiment of the present disclosure has the following advantages: packaging of plaintext such as transmitted content and locally stored date, determination of the secret keys, control of encryption during storage and transmission are random; this method has a higher encryption intensity compared with encryption intensities of currently popular QR codes and the self-encrypted two-dimensional codes evolved based on the QR codes; and this method can recognize the information code image through a camera of mobile terminal, thus having a convenient and fast recognition property.

In the anti-counterfeit method provided by the embodiment of the present disclosure, the micro-texture image contained in the information code image effectively prevents a possibility of counterfeiting and through the raw data in batches physically and algorithmically; compared with the two-dimensional bar code in the related art, the anti-counterfeit method provided by the embodiment of the present disclosure is more advanced in anti-counterfeit performance and better in an anti-counterfeit function.

Embodiment 2

Figure 3:
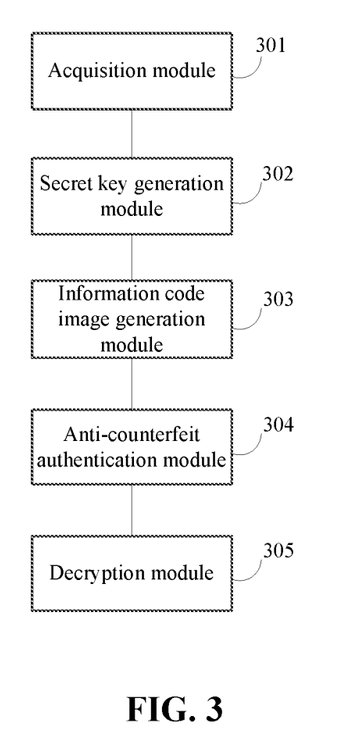
FIG. 3 is a structure diagram of an anti-counterfeit device according to embodiment 2 of in the present disclosure.

FIG. 3 is a structure diagram of an anti-counterfeit device according to embodiment 2 of the present disclosure. The device includes:

an acquisition module 301, which is configured to obtain the raw data to be encoded;

a secret key generation module 302, which is configured to collect fingerprint data by analogue acquisition to obtain initial fingerprint feature information and to encrypt the initial fingerprint feature information to obtain a random feature secret key; the random feature secret key includes a first sub secret key and a second sub secret key, and the first sub secret key is encoded into a micro-texture image while the second sub secret key is embedded in an encryption program;

an information code image generation module 303, which is configured to encrypt, through the random feature secret key, the raw data to be encoded to generate an information code image; the information code image includes the micro-texture image;

an anti-counterfeit authentication module 304, which is configured to make an anti-counterfeit authentication passed if an image sensor succeeds in integrating the first sub secret key and the second sub secret key to generate the random feature secret key;

a decryption module 305, which is configured to succeed in decrypting, by the image sensor, the information code image through the random feature secret key.

Embodiment 2 of the present disclosure further provides a storage medium, which is configured to store computer-executable instructions for implementing any anti-counterfeit method described above.

Figure 4:
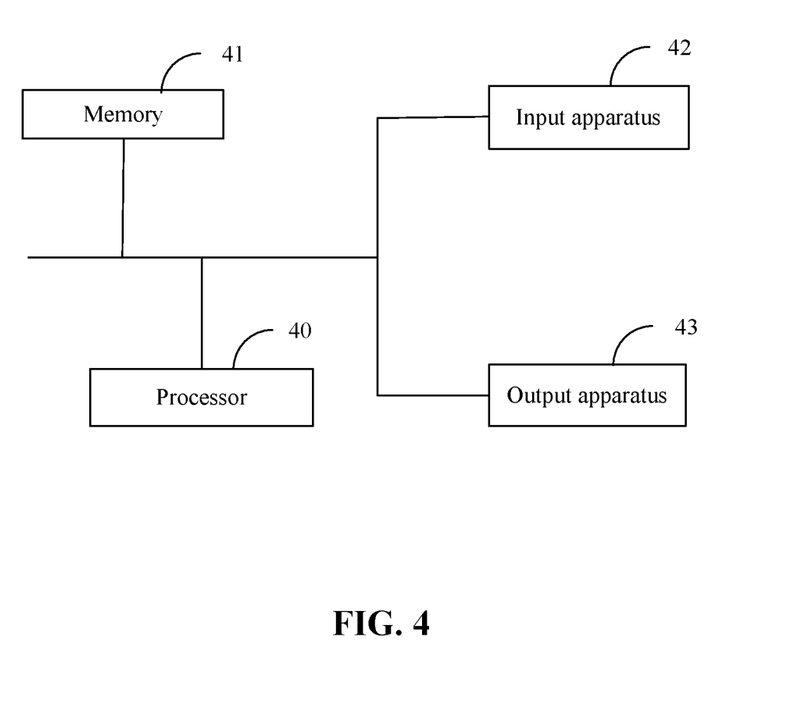
FIG. 4 is a structure diagram illustrating hardware of an electronic device of an anti-counterfeit method according to embodiment 2 of the present disclosure.

Embodiment 2 of the present disclosure further provides an anti-counterfeit electronic device. Referring to FIG. 4 which illustrating a structure diagram illustrating hardware of the anti-counterfeit electronic device, the device comprises one or more processors 40 and a memory 41. FIG. 4 illustrates an example in which one processor 40 is used.

The device further comprises an input apparatus 42 and an output apparatus 43. The processors 40, memory 41, input apparatus 42 and output apparatus 43 of the device are connected to each other by a bus or another mode. FIG. 4 illustrates an example in which the bus is used to connect the components.

The memory 41, as a computer-readable storage medium, can be used to store software programs and computer-executable instructions, e.g., the anti-counterfeit program instructions/modules (the acquisition module 301, the secret key generation module 302, the information code image generation module 303, the anti-counterfeit authentication module 304 and the decryption module 305 in FIG. 3) corresponding to the anti-counterfeit method in the embodiment of the present disclosure. The processor 40 performs function applications and date processing of a server (i.e., implementing the anti-counterfeit method in the above method embodiment) by running software programs, instructions and modules stored in the memory 41.

The memory 41 may include a program storage area and a date storage area. The program storage area may store an operating system and at least one application program required by functions. The date storage area may store data created based on the use of a terminal device. In addition, the memory 41 may comprise a high-speed random-access memory and may further comprise a non-volatile memory, e.g., at least one disk memory, a flash memory or other non-volatile solid-state memories. In some examples, the memory 41 may comprise memories configured remote from the processor 40. These remote memories can be connected to the terminal device via a network. Examples of the preceding network include, but not limited to, an internet, an intranet, a local area network, a mobile communication network and a combination of these networks.

The input apparatus 42 may be configured to receive input numbers or characters and generate key signal input related to user settings and function control of the terminal. The output apparatus 43 may include a display device such as a display screen.

The one or more modules are stored in the memory 41. When executing the one or more modules, the one or more processors 40 implements any anti-counterfeit method described above.

The above are only preferred embodiments of the present disclosure and are not intended to limit the scope of the present disclosure. It is to be understood by those skilled in the art that various improvements made by using solutions provided by embodiments of the present disclosure are within the scope of the present disclosure.

From the above description of embodiments, it will be apparent to those skilled in the art that the present disclosure may be implemented by software and necessary general-purpose hardware, or may be implemented by hardware. Based on this understanding, solutions provided by embodiments of the present disclosure may be embodied by a software product. The computer software product may be stored in a computer-readable storage medium, such as a computer floppy disk, a read-only memory (ROM), a random-access memory (RAM), a flash memory, a hard disk or an optical disk. The computer software product includes one or more instructions for making a computer device (which may be a personal computer, a server, or a network, etc. apparatuses) implement the method provided by embodiments of the present disclosure.

It should be noted that, in the memory access and processing embodiments described above, the included units and modules are divided by functional logic, but are not limited to the above division mode, as long as corresponding functions can be achieved; in addition, the names of the functional units are only to distinguish between the functional units and are not intended to limit the scope of the present disclosure.

INDUSTRIAL APPLICABILITY

In the anti-counterfeit method provided by embodiments of the present disclosure, the micro-texture image contained in the information code image effectively prevents a possibility of counterfeiting and using the raw data in batches physically and algorithmically; compared with the two-dimensional bar code in the related art, the anti-counterfeit method provided by embodiments of the present disclosure is more advanced in anti-counterfeit performance and better in the anti-counterfeit function.

What is claimed is:

1. A data encryption method, wherein the method uses a mixture of a fingerprint feature data acquisition technology, a random feature secret key generation technology and an encryption two-dimensional code recognition technology, and the method comprises:
   obtaining raw information about a two-dimensional code;
   collecting fingerprint data by analogue acquisition to obtain initial fingerprint feature information, encrypting the initial fingerprint feature information to obtain a random feature secret key, and encoding the raw information through the random feature secret key to generate a new two-dimensional code image, wherein the random feature secret key comprises a first sub secret key and a second sub secret key, and wherein the first sub secret key of the random feature secret key is stored in a micro-texture image, the second sub secret key is embedded in a program;
   passing a first anti-counterfeit authentication when an image sensor succeeds in integrating the first sub secret key and the second sub secret key to generate the random feature secret key; and failing to pass the first anti-counterfeit authentication and terminating current communication when the image sensor fails to integrate the first sub secret key and the second sub secret key to generate the random feature secret key; and
   decrypting, by the image sensor, the two-dimensional code through the random feature secret key; when the decrypted information is consistent with the raw information about the two-dimensional code, determining that the result is true and passing a second anti-counterfeit authentication; and when the decrypted information is inconsistent with the raw information about the two-dimensional code, determining that the result is false and failing to pass the second anti-counterfeit authentication,
wherein encrypting the initial fingerprint feature information comprises:
  denoting texture feature data as a matrix M=[X1 X2 X3 Xp] p×n composed of values of p variables P=[x y] observed at n times, wherein P denotes a randomly simulated fingerprint feature point, and the functional relationship between P and x, y is $$P1 = \begin{bmatrix} x' \\ y' \end{bmatrix} \text{ and } \begin{cases} x' = x + t_x \\ y' = y + t_y \end{cases};$$

performing R×P1 to rotate P1, wherein R and x, y form a functional relationship $$R = \begin{bmatrix} \cos\theta - \sin\theta \\ \sin\theta \cos\theta \end{bmatrix} \text{ and } \begin{cases} x' = x\cos\theta - y\sin\theta \\ y' = x\sin\theta + y\cos\theta \end{cases},$$

where θ is a rotation angle and R is a rotation matrix respectively; and
  forming a scaling matrix S for the rotated and translated P2 and performing $$P3 = S \times P2 \text{ according to } \begin{cases} x' = S_x x \\ y' = S_y y \end{cases}, \text{ wherein } S = \begin{bmatrix} S_x 0 \\ 0 S_y \end{bmatrix},$$

where Sx and Sy have a same value.

2. The data encryption method of claim 1, wherein the lighting characteristic of the image sensor and of the micro-texture image which cooperates with the image sensor to read out information possesses at least one of spectral characteristics including infrared light, visible light and ultraviolet light.

3. The data encryption method of claim 1, wherein the micro-texture image comprises with more than one set of dots disposed inside and at a periphery of the micro-texture image, wherein the more than one set of dots are geometrically and physically distributed, and each set of dots has a function of recording information, wherein the size of each dot is 1 to 4 pixels.

4. An anti-counterfeit method comprising:
  obtaining raw data to be encoded;
  collecting fingerprint data by analogue acquisition to obtain initial fingerprint feature information and encrypting the initial fingerprint feature information to obtain a random feature secret key, wherein the random feature secret key comprises a first sub secret key and a second sub secret key and wherein the first sub secret key is encoded into a micro-texture image while the second sub secret key is embedded in an encryption program;
  encrypting, through the random feature secret key, the raw data to be encoded to generate an information code image, wherein the information code image comprises the micro-texture image;
  passing an anti-counterfeit authentication when an image sensor succeeds in integrating the first sub secret key and the second sub secret key to generate the random feature secret key; and succeeding in decrypting, by the image sensor, the information code image through the random feature secret key,
wherein encrypting the initial fingerprint feature information to obtain the random feature secret key comprising:
  denoting the initial fingerprint feature information as a matrix M=[X1 X2 X3 . . . Xp] p×n composed of values of variables P=[x y] observed at n times, wherein P denotes a randomly simulated fingerprint feature point, and the functional relationship between P1, x and y is $$P1 = \begin{bmatrix} x' \\ y' \end{bmatrix} \text{ and } \begin{cases} x' = x + t_x \\ y' = y + t_y \end{cases},$$

wherein T is a translation vector and $$T = \begin{bmatrix} t_x \\ t_y \end{bmatrix},$$

P1 is a fingerprint feature point formed by translating P;
  performing P2=R×P1, where P2 is a fingerprint feature point formed by rotating P1, θ and R are a rotated angle and a rotation matrix respectively, wherein R, x and y form a functional relationship $$R = \begin{bmatrix} \cos\theta - \sin\theta \\ \sin\theta \cos\theta \end{bmatrix} \text{ and } \begin{cases} x' = x\cos\theta - y\sin\theta \\ y' = x\sin\theta + y\cos\theta \end{cases};$$

forming a scaling matrix S for the rotated and translated P2 and performing $$P3 = S \times P2 \text{ using } \begin{cases} x' = S_x x \\ y' = S_y y \end{cases}, \text{ where } S = \begin{bmatrix} S_x 0 \\ 0 S_y \end{bmatrix},$$

Sx and Sy have a same value, wherein P3 is a fingerprint feature point formed by scaling P2; and
  splicing the fingerprint feature point P3 to obtain the random feature secret key, wherein the fingerprint feature point P3 is obtained from translation, rotation and scaling.

5. The anti-counterfeit method of claim 4, wherein after the random feature secret key is used to encrypt the raw data to be encoded to generate the information code image, the method further comprises: when the image sensor fails to integrate the first sub secret key and the second sub secret key to generate the random feature secret key, failing to pass the anti-counterfeit authentication and terminating current communication.

6. The anti-counterfeit method of claim 4, wherein the image sensor possesses at least one of spectral characteristics including infrared light, visible light and ultraviolet light.

7. The anti-counterfeit method of claim 4, wherein the micro-texture image comprises more than one set of dots disposed inside and at a periphery of the micro-texture image, wherein the more than one set of dots are geometrically and physically distributed, and each set of dots has a function of recording information, wherein the size of each dot is 1 to 4 pixels.

8. A non-transitory computer-readable storage medium, which is configured to store computer-executable instructions for implementing the anti-counterfeit method comprising:
  obtaining raw data to be encoded;
  collecting fingerprint data by analogue acquisition to obtain initial fingerprint feature information and encrypting the initial fingerprint feature information to obtain a random feature secret key, wherein the random feature secret key comprises a first sub secret key and a second sub secret key and wherein the first sub secret key is encoded into a micro-texture image while the second sub secret key is embedded in an encryption program;
  encrypting, through the random feature secret key, the raw data to be encoded to generate an information code image, wherein the information code image comprises the micro-texture image;
  passing an anti-counterfeit authentication when an image sensor succeeds in integrating the first sub secret key and the second sub secret key to generate the random feature secret key; and
  succeeding in decrypting, by the image sensor, the information code image through the random feature secret key wherein encrypting the initial fingerprint feature information to obtain the random feature secret key comprising:
  denoting the initial fingerprint feature information as a matrix M=[X1 X2 X3 Xp] p×n composed of values of variables P=[x y] observed at n times, wherein P denotes a randomly simulated fingerprint feature point, and the functional relationship between P1, x and y is $$P1 = \begin{bmatrix} x' \\ y' \end{bmatrix} \text{ and } \begin{cases} x' = x + t_x \\ y' = y + t_y \end{cases},$$

wherein T is a translation vector and $$T = \begin{bmatrix} t_x \\ t_y \end{bmatrix},$$

P1 is a fingerprint feature point formed by translating P;
  performing P2=R×P1, where P2 is a fingerprint feature point formed by rotating P1, θ and R are a rotated angle and a rotation matrix respectively, wherein R, x and y form a functional relationship $$R = \begin{bmatrix} \cos\theta & -\sin\theta \\ \sin\theta & \cos\theta \end{bmatrix} \text{ and } \begin{cases} x' = x\cos\theta - y\sin\theta \\ y' = x\sin\theta + y\cos\theta \end{cases};$$

forming a scaling matrix S for the rotated and translated P2 and performing $$P3 = S \times P2 \text{ using } \begin{cases} x' = S_x x \\ y' = S_y y \end{cases}, \text{ where } S = \begin{bmatrix} S_x & 0 \\ 0 & S_y \end{bmatrix},$$

Sx and Sy have a same value, wherein P3 is a fingerprint feature point formed by scaling P2; and
  splicing the fingerprint feature point P3 to obtain the random feature secret key, wherein the fingerprint feature point P3 is obtained from translation, rotation and scaling.

9. The computer-readable storage medium of claim 8, wherein after the random feature secret key is used to encrypt the raw data to be encoded to generate the information code image, the method further comprises: when the image sensor fails to integrate the first sub secret key and the second sub secret key to generate the random feature secret key, failing to pass the anti-counterfeit authentication and terminating current communication.

10. The computer-readable storage medium of claim 8, wherein the image sensor possesses at least one of spectral characteristics including infrared light, visible light and ultraviolet light.

11. The computer-readable storage medium of claim 8, wherein the micro-texture image comprises more than one set of dots disposed inside and at a periphery of the micro-texture image, wherein the more than one set of dots are geometrically and physically distributed, and each set of dots has a function of recording information, wherein the size of each dot is 1 to 4 pixels.

12. An electronic device comprising:
  at least one processor; and
  a memory connected to and communicating with the at least one processor,
  wherein the memory stores instructions executable by the at least one processor that, when executing the instructions, implements the anti-counterfeit method according to claim 4.

13. The electronic device of claim 12, wherein after the random feature secret key is used to encrypt the raw data to be encoded to generate the information code image, the method further comprises: when the image sensor fails to integrate the first sub secret key and the second sub secret key to generate the random feature secret key, failing to pass the anti-counterfeit authentication and terminating current communication.

14. The electronic device of claim 12, wherein the image sensor possesses at least one of spectral characteristics including infrared light, visible light and ultraviolet light.

15. The electronic device of claim 12, wherein the micro-texture image comprises more than one set of dots disposed inside and at a periphery of the image, wherein the more than one set of dots are geometrically and physically distributed, and each set of dots has a function of recording information, wherein the size of each dot is 1 to 4 pixels.

* * * * *